Patented Aug. 24, 1948

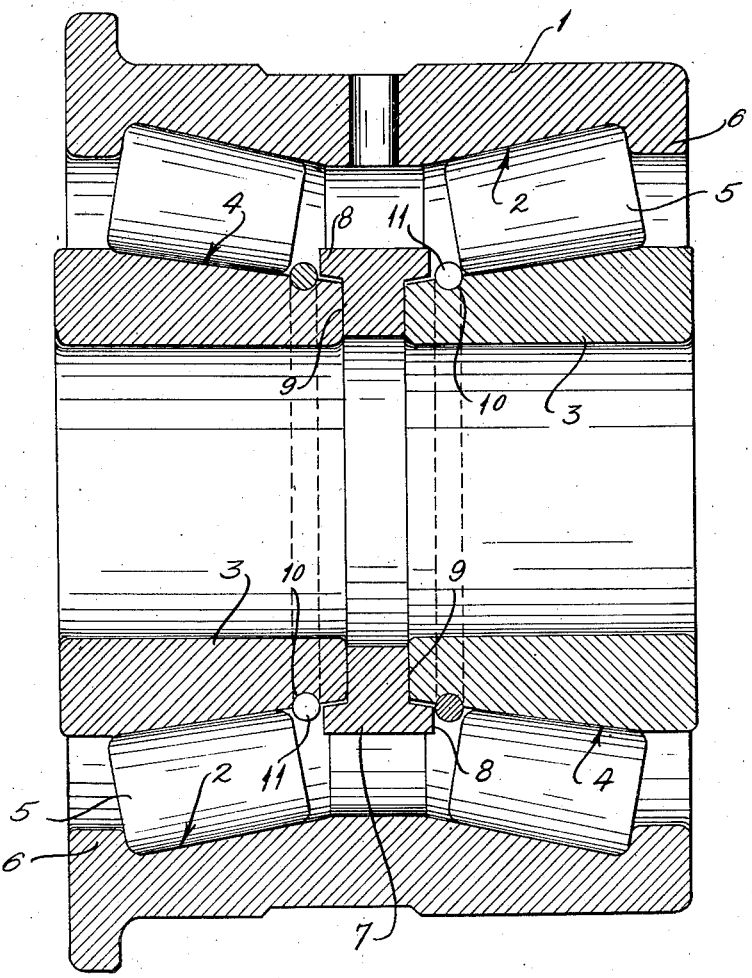

2,447,928

UNITED STATES PATENT OFFICE 2,447,928

UNIT HANDLED DOUBLE ROW ROLLER BEARING

Albert L. Bergstrom, Canton, Ohio, assignor to The Timken Roller Bearing Company, Canton, Ohio, a corporation of Ohio Application May 19, 1947, Serial No. 749,005

7 Claims. (Cl. 308—214)

This invention relates to roller bearings of the type comprising two axially spaced circular series of rollers, a single outer bearing member for both series of rollers and a separate inner bearing member for the rollers of each series. The invention has for its principal object to provide a bearing of the above type that can be quickly and easily assembled to form a self-contained unit. Other objects are simplicity and cheapness of construction and compactness of design. The invention consists in the self-contained double row roller bearing and in the parts and combinations and arrangements of parts hereinafter described and claimed.

The accompanying drawing, which forms part of this specification and wherein like symbols refer to like parts wherever they occur, is a central longitudinal sectional view of a self-contained double tapered roller bearing embodying my invention.

In the accompanying drawing, my invention is shown embodied in a cageless, full-roll type of double row tapered roller bearing comprising a single outer bearing member or cup 1 having two conical raceways 2 therein that taper towards the middle of the bearing, two separate cones or inner bearing members 3 having conical raceways 4 which taper towards each other, and a circular series of conical rollers 5 interposed between the raceway of each inner bearing member and the corresponding raceway of the outer bearing member. The outer bearing member 1 has internal peripheral thrust ribs 6 that are integral therewith and overlap the large ends of the rollers 5. Interposed between the inner bearing members 3 is an annular spacer member 7 of sufficient thickness to give said inner bearing members the position required for proper running clearance between the rollers 5 and the raceways 2 and 4. The annular spacer 7 has a wide outer peripheral end flange 8, forming in opposite ends of said spacer annular recesses 9 adapted to receive the adjacent inner end portions of the inner bearing members 3.

Each of the inner bearing members 3 has an external annular groove 10 formed therein between the inner ends of the series of rollers 5 cooperating therewith and the adjacent end of the outer peripheral flange 8 of the annular spacer 7; and seated in said groove is a split snap-on retaining ring 11 that forms on said inner bearing member an external peripheral rib that overlaps said inner ends of said rollers. By this arrangement, the body of the annular spacer 7 serves to give the inner bearing members or cones 3 the position required for proper running clearance between the rollers 5 and their raceways, while the thrust ribs 6 at the outer ends of the single outer bearing member or cup 1 and the retaining-rings 11 on the inner end portions of said inner bearing members or cones serve to prevent axial separation of the bearing parts in either direction, thereby permitting the entire bearing assembly to be handled as a complete self-contained unit. The outer peripheral flange 8 of the annular cone spacer 7 serves to position the spacer crosswise of the bearing.

In assembling the above described bearing, one series of rollers 5 is mounted in one of the raceways 2 of the double outer bearing member or cup 1, and one of the inner bearing members or cones 3 is positioned within said series of rollers. One of the snap rings 11 is then forced over the end of the cone 3 and seated in the groove 10 therein. The annular spacer 7 is then placed against the inner end of the first cone 3, with said end of said cone seated in the annular recess or pocket 9 in the adjacent end of said spacer. If desired, the rim flange 8 of the annular spacer 7 may be used to force the snap ring 11 into position on the first cone 3. The second snap ring 11 is then seated on the other end of the rim flange 8 of the annular spacer 7, the rollers 5 of the second series are arranged on the other raceway of the double outer bearing member or cup 1, and the second inner bearing member or cone 3 is then placed inside said second series of rollers. The second cone 3 is then pressed axially inwardly to seat the inner end thereof into the other annular recess or pocket 9 of the annular spacer 7, during which operation the second snap ring 11 is forced over the inner end of said second cone and snaps into the groove 10 therein, thus completing the assembly of the bearing. The rim flange 8 of the annular spacer 7 is wide enough to move the second snap ring 11 into position to seat in the groove 10 of the second cone 3. Proper running clearances are provided in the assembled bearing unit between the snap rings 11 and the inner ends of the rollers 5 and between said snap rings and the ends of the rim flanges 8 of the annular spacer 7.

What I claim is:

1. A double row taper roller bearing comprising two axially spaced circular series of rollers, a single outer bearing member for said series of rollers, separate inner bearing members for said series of rollers, said outer bearing member having integral internal peripheral thrust ribs overlapping the outer ends of said series of rollers, and a separate external peripheral retaining rib mounted on each of said inner bearing members against axial movement relative thereto in overlapping relation to the inner ends of the rollers cooperating therewith, thereby making a self-contained unit of said rollers and outer and inner bearing members.

2. The combination set forth in claim 1 wherein each of said inner bearing members has an external annular peripheral groove therein opposite the inner ends of the rollers cooperating therewith and the retaining rib thereon comprises a snap ring seated in said annular groove.

3. A double row roller bearing comprising two axially spaced circular series of rollers, a single outer bearing member for said series of rollers, separate inner bearing members for said series of rollers, and an annular spacer member interposed between the opposing inner ends of said inner raceway members, said outer bearing member having internal peripheral ribs overlapping the outer ends of said series of rollers, and each of said inner bearing members having an external peripheral rib overlapping the inner ends of the rollers cooperating therewith, thereby making a self-contained unit of said rollers, outer and inner bearing members and annular spacer member.

4. A double row taper roller bearing comprising two circular series of rollers, a single outer bearing member for said series of rollers, separate inner bearing members for said series of rollers, an annular spacer member interposed between the opposing inner ends of said inner bearing members, said outer bearing member having integral internal peripheral thrust ribs overlapping the outer ends of said series of rollers and a separate internal peripheral retaining rib mounted on each of said inner bearing members against axial movement relative thereto in overlapping relation to the inner ends of the rollers cooperating therewith, thereby making a self-contained unit of said rollers, outer and inner bearing members and annular spacer member.

5. The combination set forth in claim 4 wherein each of said inner bearing members has an external annular peripheral groove therein opposite the inner ends of the rollers cooperating therewith and the retaining rib thereon comprises a snap ring seated in said annual groove.

6. A double row roller bearing comprising two axially spaced circular series of rollers, a single outer bearing member for said series of rollers, separate inner bearing members for said series of rollers, and an annular spacer member interposed between the opposing inner ends of said inner bearing members, said outer bearing member having internal peripheral thrust ribs overlapping the outer ends of said series of rollers, and each of said inner bearing members having an external peripheral retaining rib overlapping the inner ends of the rollers cooperating therewith, thereby making a self-contained unit of said rollers, outer and inner bearing members and annular spacer member.

7. A double row taper roller bearing comprising two axially spaced series of rollers, a single outer bearing member for said rollers, a separate inner bearing member for each series of rollers, an annular spacer member interposed between the opposing inner ends of said inner bearing members and having a rim flange overlapping said ends of said inner bearing members, said outer bearing member having an internal annular thrust rib disposed in abutting relation to the outer ends of said rollers, and each of said inner bearing members having an external annular groove therein between the inner ends of the rollers which cooperate therewith and the adjacent end of said rim flange, and a snap ring seated in said groove, said thrust ribs of said outer bearing member and said snap rings on said inner bearing members preventing endwise separation of all of the parts of said bearing and thereby making a self-contained unit thereof.

ALBERT L. BERGSTROM.

REFERENCES CITED

The following references are of record in the file of this patent:

UNITED STATES PATENTS

| Number | Name | Date |
| --- | --- | --- |
| 1,927,534 | Wooler | Sept. 19, 1933 |